Nov. 23, 1943.                R. E. DI VETTE                2,334,910
                              CONTROL APPARATUS
                           Filed Sept. 13, 1941           3 Sheets-Sheet 1

Fig.1

INVENTOR.
Randolph E. DiVette
BY George H. Fisher
Attorney

Nov. 23, 1943.     R. E. DI VETTE     2,334,910
CONTROL APPARATUS
Filed Sept. 13, 1941     3 Sheets-Sheet 2

INVENTOR.
Randolph E. DiVette
BY George H. Fisher
Attorney

Nov. 23, 1943.　　　R. E. DI VETTE　　　2,334,910
CONTROL APPARATUS
Filed Sept. 13, 1941　　　3 Sheets-Sheet 3

Fig. 5

INVENTOR.
Randolph E. DiVette
BY George H. Fisher
Attorney

Patented Nov. 23, 1943

2,334,910

UNITED STATES PATENT OFFICE 2,334,910

CONTROL APPARATUS

Randolph E. Di Vette, Minneapolis, Minn., assignor to Minneapolis-Honeywell Regulator Company, Minneapolis, Minn., a corporation of Delaware Application September 13, 1941, Serial No. 410,790

17 Claims. (Cl. 236—9)

The present invention is concerned with a motorized mechanism and more particularly one adapted to position a member movable between a safe first position and an active second position.

In many instances it is desirable to utilize a motor to position a device which is movable between a safe normal position and an active position. Thus one typical instance is that of a motorized valve controlling the flow of gas to a gas burner or the flow of other heating fluid to a heating apparatus. In such a case, the valve is biased to closed position to insure the return of the valve to this position in the event of power failure. Another type of device of this character is a switch which is active only when it is closed. It is desirable in case of failure of the switch actuating mechanism for the switch to be moved to its circuit open or its safe position. The present invention is concerned with an arrangement wherein a motor positions such an element, the arrangement being particularly adaptable to the positioning of a valve.

An object of the present invention is to provide, in a control system for a motor adapted to drive a device from a safe position to an active position, improved means for insuring the return of the device to its safe position in the event a control condition reaches a limiting value.

A further object of the invention is to construct a motorized valve mechanism whereby the valve may be opened either manually or automatically, with means for insuring closure of the valve whenever a control condition reaches a limiting valve, regardless of whether the valve was opened manually or automatically.

A further object of the invention is to provide a motor operator mechanism for a control device including an electrical motor and a one-way braking mechanism associated therewith, and an electrical clutch connecting the motor and brake with the control device, whereby the control device may be driven from a safe position to an active position by energization of the motor and the clutch, and held in its active position by the brake after deenergization of the motor.

Another object of the invention is to provide improved and simplified control circuits for motorized valves.

Further objects and advantages of the invention will appear from a consideration of the accompanying specification, claims, and drawings, in which

Figures 1 to 4

Figure 1:
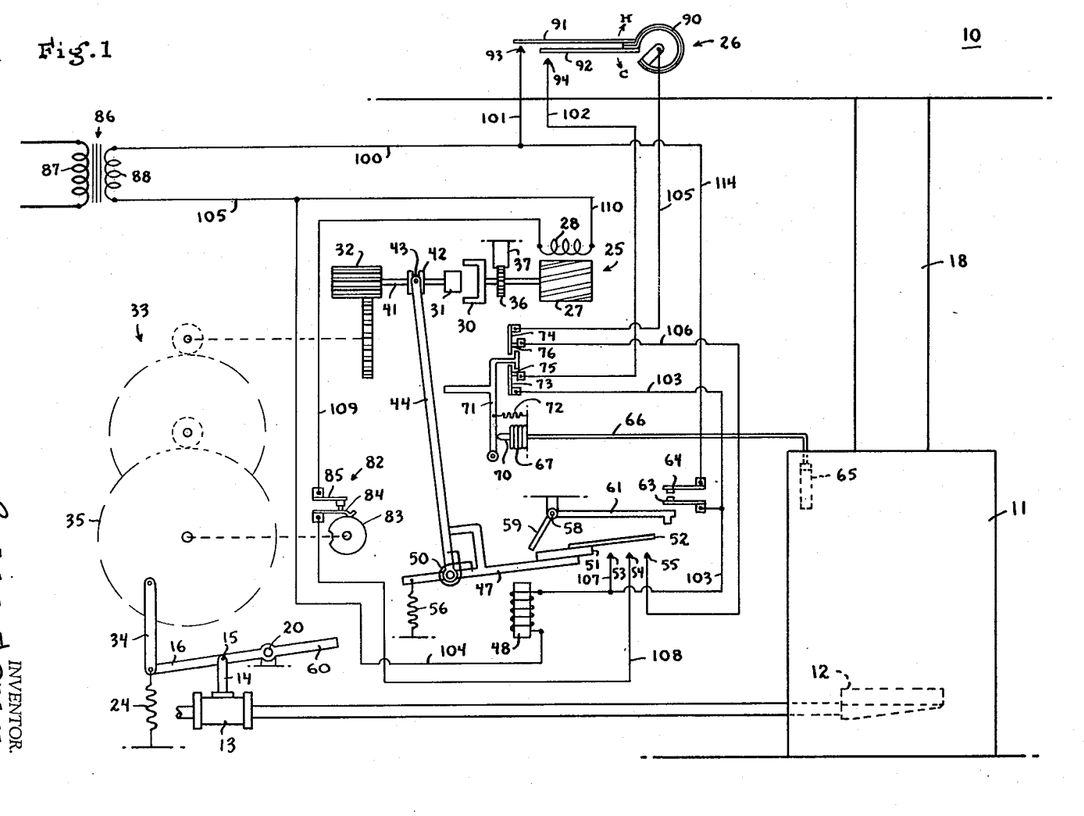
Figure 1 represents somewhat diagrammatically a preferred form of control system embodying my invention.

Figure 1 shows a system for heating the air in a space 10 including a furnace 11 having a fuel burner 12. A valve 13 controls the supply of fuel to the burner 12.

Figure 2:
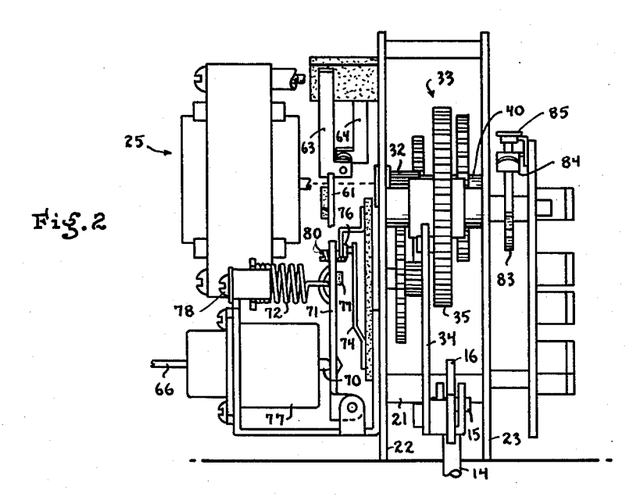
Figure 2 represents a front elevation of a motor and control unit embodying the form of my invention illustrated diagrammatically in Figure 1.
Figure 3:
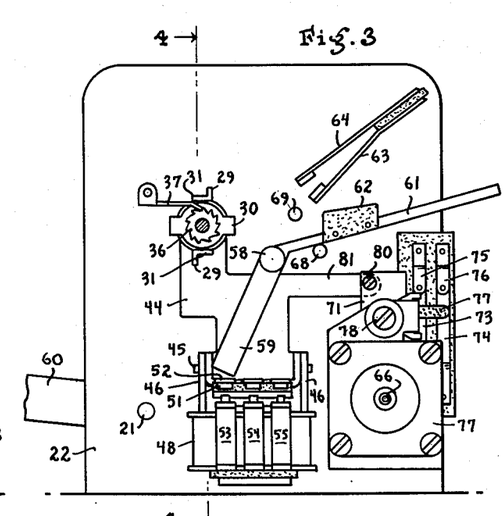
Figure 3 represents an end elevation of the unit shown in Figure 2, looking from the left in that figure, certain parts being omitted for the sake of clarity.

Valve 13 is operated by means of a stem 14, pivotally connected, as at 15, to a lever arm 16. The lever arm 16 is pivotally supported as at 20, on a shaft 21 (Figures 2 and 3). The shaft 21 is mounted between two bracket plates 22 and 23 which supports the various parts of the motor and control unit.

A spring 24, or other suitable biasing means, acts on the lever arm 16 and tends to maintain it in a position wherein the valve 13 is closed. A motor 25 is provided which may operate the lever arm 16 so as to move the valve 13 to open position. Operation of motor 25 is controlled by the thermostat 26 located in the space 10.

Motor 25 drives the lever arm 16 through a pair of clutch members 30 and 31. Clutch member 30 is connected to the rotor of the motor 25, while clutch member 31 is mounted on the shaft of an elongated pinion 32. Pinion 32 drives the first gear of a train, generally indicated at 33. A link 34 is pivotally attached to the final gear 35 of the train 33. The other end of the link 34 is pivotally connected to one end of the lever arm 16.

Motor 25 is provided with a rotor 27 and a field winding 28. Fixed on the shaft of rotor 27 is a ratchet wheel 36. A pawl 37, mounted on the bracket plate 22, engages the ratchet wheel 36 so as to prevent reverse rotation of the rotor 27.

Figure 4:
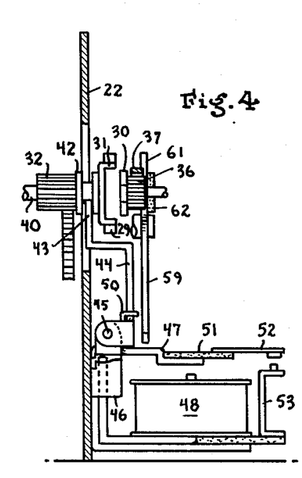
Figure 4 represents a sectional view taken along the line 4—4 of Figure 3, looking in the direction of the arrows.

The pinion 32 is rigidly secured to short shaft 41 and telescopingly fits over the stub end of a shaft 40. Shaft 40 also carries one of the gears of the train 33, and is journalled in the bracket plate 23. The shaft 41 also carries clutch member 31 and a grooved collar 42. A yoke 43 cooperates with the grooved collar 42 to translate the assembly consisting of clutch member 31, shaft 41, collar 42, and pinion 32 with respect to the shaft 40 and the gear train 33 so as to cause engagement or disengagement of the clutch member 31 with the clutch member 30.

Clutch member 31 is provided with a pair of upstruck vanes 29, which slow its rotation by the resistance of the air to rapid movements of the vanes.

Yoke 43 is mounted on the end of a lever 44. Lever 44 is pivoted on a shaft 45 carried by a pair of brackets 46 mounted on the plate 22. Also pivoted on the shaft 45 is an armature 47 adapted to cooperate with an electromagnet 48. A strain release spring 50 biases the lever 44 into engagement with the armature 47, so that the two elements normally move as a unit. The armature 47 carries an insulating member 51 which supports a bridging contact member 52. The contact member 52 is forked into three fingers which cooperate with stationary contacts 53, 54 and 55. The armature 47 is biased into a position wherein the contact member 52 is disengaged from the stationary contacts 53, 54 and 55. This biasing is done by means of a spring 56, shown diagrammatically in Figure 1, but omitted from Figures 3 and 4 for the sake of clarity.

An extension 60 is provided on the end of the lever arm 16 so that the valve 13 may be operated manually to open position in the event that the power has failed, or for some other reason the motor 25 is not operative. A second manually operable lever 61 is provided for latching the valve in open position after it has been moved there by the lever 60. The lever 61 is pivoted on the bracket plate 22, as at 58, and is movable between two stops 68 and 69. In the position shown in the drawing, the lever 61 is in its unlatched position, and engages the stop 68. Rotation of the lever 61 in a counter-clockwise direction from its unlatched position to its latched position, wherein it engages stop 69 causes its lower end 59 to engage the armature 47 and move it towards its attracted position sufficiently far that clutch members 30 and 31 are engaged. Since the clutch member 30 is prevented from reverse rotation by the bracket and pawl 36 and 37, the valve 13 cannot then move to closed position under the influence of the spring 24.

An insulating plate 62 is mounted on the lever 61. When the lever 61 is moved to its latching position, the plate 62 engages a flexible switch member 63 and moves it into engagement with a stationary switch member 64.

Limit control means are provided for causing closure of the valve in the event of the occurrence of a dangerous condition within the furnace 11. This limit control means is shown, by way of example, as comprising a bulb 65 containing a volatile fluid whose pressure varies with the temperature in the furnace. If a hot air furnace is used such as the one disclosed in the drawings, the bulb 65 is mounted in the bonnet of the furnace. Bulb 65 is connected by a tube 66 to a bellows 67. Bellows 67 is mounted within a suitable protective casing 77. Bellows 67 carries an actuator 70 which engages a lever 71. A spring 72 biases the lever 71 into engagement with the actuator 70. A switch structure, comprising a pair of flexible blades 73 and 74, self-biased into engagement with a pair of stationary contacts 75 and 76, respectively, is mounted adjacent the lever 44. A finger 77, of insulating material, is mounted on the lever 71, so that upon movement of the lever 71 by the actuator 70, the finger 77 is moved into engagement with the flexible contacts 73 and 74 and causes them to separate from their associated stationary contacts 75 and 76. A screw 80 is threaded through a portion of the lever 71 and extends into proximity with an extension on the lever 44. The construction is such that as the lever 71 moves in a clockwise direction under the influence of the actuator 70, the screw 80 will engage the end of extension 81 and move the lever 44 in such a direction as to separate the clutch members 30 and 31.

Means including a screw 78 are provided for adjusting the tension on the spring 72. The tension on this spring determines the temperature within the furnace 11 at which sufficient pressure is produced in the bulb 65 and bellows 67 to cause opening of the switches 73—75 and 74—76. Similarly, adjustment of the screw 80 determines the temperature within the furnace 11 which is sufficient to force disengagement of the clutch 30—31 by operation of lever 44 through screw 80.

Since the normal operation of the system is electrical, the screws 78 and 80 are usually set so that the switches 73—75 and 74—76 will be opened at a lower temperature than that which causes screw 80 to mechanically disengage clutch members 30 and 31. The mechanical disengagement of the clutch by the limit control occurs only in emergencies when such adjustment of the screws 78 and 80 are made.

A limit switch 82 is provided for deenergizing the motor field winding 28 when the valve 13 reaches open position. Switch 82 is operated by a cam 83 fixed to the same shaft as the final gear 35 of the gear train 33. A flexible switch finger 84 rests as a follower on the cam 83 and cooperates with a stationary switch contact 85.

Power is supplied to the system by a transformer 86 having a primary winding 87 and a secondary winding 88. Primary winding 87 may be connected to any commercial source of power, and secondary winding 88 is connected to the control system.

Thermostat 26 comprises a bimetallic element 90 supporting a pair of movable switch fingers 91 and 92. Stationary switch contacts 93 and 94 are positioned for engagement by the contacts 91 and 92, respectively. The construction is such that upon a drop in temperature, the switch fingers 91 and 92 are moved counter-clockwise, as indicated by the legend in the drawing. Contacts 92 and 94 are spaced more widely than contacts 91 and 93, so that the pairs of contacts engage sequentially.

*Operation of Figure 1*

When the parts are in the positions shown in the drawing, the thermostat 26 is satisfied. In other words, the temperature of the space 10 is above the value which the thermostat 26 has been set to maintain, and the thermostat is therefore not calling for heat. The valve 13 is therefore closed, and the furnace 11 is not in operation.

Let it be assumed that the temperature of the space 10 drops with the result that the bidmetallic element 90 moves the contacts 91 and 92 in a counter-clockwise direction, thereby sequentially engaging first the contacts 91 and 93 and then the contacts 92 and 94. When the contacts 91 and 93 engage, no circuit is completed and therefore no operation of the control system immediately follows.

When contacts 92 and 94 engage, however, an energizing circuit is completed for the electromagnet 48. This circuit may be traced from the upper terminal of transformer secondary winding 88 through conductors 100 and 101, contact 93, switch fingers 91 and 92, contact 94, a conductor 102, switch members 75 and 73, a conductor 103, electromagnet 48, and conductors 104 and 105 to the lower terminal of transformer secondary winding 88.

Energization of the electromagnet 48 causes armature 47 to be attracted, thereby moving switch member 52 into engagement with contacts 53, 54 and 55.

Engagement of contacts 53 and 55 with bridging contact member 52 completes a holding circuit for electromagnet 48 which is independent of contacts 92 and 94. This circuit may be traced from the upper terminal of secondary winding 88 through conductors 100 and 101, contact 93, switch finger 91, bimetallic element 90, a conductor 105, switch members 74 and 76, a conductor 106, switch members 55, 52 and 53, a conductor 107, electromagnet 48 and conductors 104 and 105 to the lower terminal of transformer secondary winding 88.

Engagement of switch member 52 with contacts 55 and 54 completes an energizing circuit for motor field winding 28 which may be traced from the upper terminal of secondary winding 88 through conductors 100 and 101, contact 93, finger 91, bimetallic element 90, conductor 105, switch members 74 and 76, conductor 106, switch members 55, 52 and 54, a conductor 108, switch members 84 and 85, a conductor 109, winding 28, and conductors 110 and 105 to the lower terminal of transformer secondary winding 88.

The movement of armature 47 to its attracted position by electromagnet 48 also acts through the lever 44 to cause engagement of the clutch members 31 and 30. Therefore, upon energization of electromagnet 48, the motor 25 drives the valve 13 to an open position through the gear train 33. When the valve 13 reaches open position, the switch member 84 drops into a notch on the surface of the cam 83, thereby separating from switch member 85 and opening the circuit of motor winding 28. Motor 25 therefore stops, but is held from reverse rotation by engagement of pawl 37 with ratchet wheel 36. As long as contacts 91 and 93 remain in engagement, the holding circuit for the electromagnet 48, previously described, remains energized, thereby maintaining clutch members 30 and 31 in engagement and keeping the valve in open position.

As soon as the valve 13 is open, fuel is supplied to the burner 12, where it is ignited by any suitable igniting means, of conventional type (not shown). The furnace then begins to heat air which is distributed to the space 10 through a suitable duct 18. As this heated air is delivered to the space, the temperature in the space 10 rises, and the thermostat 26 rotates the switch blades 91 and 92 in clockwise direction. As this rotation takes place, contacts 92 and 94 separate first, but since the fuel supply valve 13 is held open by a holding circuit which is independent of these contacts, their opening has no effect on the system. As the bimetallic element continues to rotate the switch blades 91 and 92 in a clockwise direction, the blade 91 separates from the contact 93. This opens the previously traced holding circuit, thereby allowing armature 47 to move away from electromagnet 48 under the influence of the spring 56. This movement of armature 47 causes disengagement of clutch members 30 and 31, thereby relieving clutch member 31 from the braking effect of ratchet and pawl 36 and 37. The valve then is returned to closed position by the spring 24, this motion being opposed only by the friction in the unloaded gear train and the air vanes 29 on clutch member 31.

In case of failure of the power supply, it may become necessary to open the valve 13 manually in order to supply heat to the space 10. This may be done by pushing down on the extension 60 of lever arm 16. After the valve 13 has been thus opened, it may be latched open by lifting up on the right-hand end of lever 61. When this is done, the lower end 59 of lever 61 engages the armature 47, forcing it down until the clutch members 30 and 31 are brought into engagement. The ratchet 36 and pawl 37 are then effective to prevent reverse rotation of the motor necessary to allow the valve 13 to move to closed position. When the lever arm 61 is moved to its latching position, the lower end 59 of lever 61 will be moved to an almost vertical position. The self-bias of flexible switch arm 63 then acts on the lever 61 and tends to turn it in a clockwise direction back toward its unlatched position. Armature 47 is held in engagement with the lower end 59 of lever 61 by means of the biasing spring 56, however, and the friction between armature 47 and lever 61 is sufficient to maintain it in its latched position against the bias of switch member 63. When it is desired to unlatch the valve manually, and allow it to return to its closed position, it is only necessary to move the lever arm 61 back to its normal or unlatched position. The armature 47 and its associated parts then return to the position shown in the drawing, wherein the clutch members 30 and 31 are disengaged. The biasing spring 24 is then effective to return the valve 13 to closed position.

When the lever 61 is moved to its latched position, the insulating member 62 engages switch member 63 and forces it into engagement with switch 64. The movement of armature 47 by lever 61 is just sufficient to engage clutch members 30 and 31 without moving armature 47 all the way down into engagement with the core of electromagnet 48. An energizing circuit for electromagnet 48 is closed by engagement of contacts 63 and 64. This circuit may be traced from the upper terminal of secondary winding 88, through conductors 100 and 114, contacts 64 and 63, conductor 103, electromagnet 48, and conductors 104 and 105 to the lower terminal of secondary winding 88. When power is returned to the system while the switch 63, 64 is closed, the electromagnet 48 is immediately energized. This pulls armature 47 down into its attracted position and away from lever 61, thereby releasing the friction which is holding it in its latched position and allowing the self-bias of switch arm 63 to kick the lever 61 back towards its unlatched position. This of course opens the energizing circuit for solenoid 48 which extends through contacts 63 and 64. If no other energizing circuit for the electromagnet 48 exists at this time, the armature 47 returns to the position shown in the drawing, and the valve 13 is closed by the biasing spring 24. If the thermostat 26 is calling for heat at this time, however, the electromagnet 48 remains energized through the holding circuit previously described and the valve remains in open position. It will therefore be seen that after the valve has been manually opened, it is immediately returned to the control of the thermostat as soon as power is again supplied to the system.

Let it now be assumed that the valve 13 has been moved to open position and that it is maintained in that position by energization of electromagnet 48 under control of thermostat 26. Let it be further assumed that the furnace 11 now becomes dangerously overheated, which condition may arise from some cause, as, for example, the accidental blocking of the outlet duct 18, which permits the room thermostat 26 to maintain the contacts 91 and 93 closed. The increase in temperature within the furnace 11 will expand the fluid in the bulb 65, thereby increasing its pressure. This increase in pressure is transmitted through the tube 66 through the bellows 67. Bellows 67 expands, acting on the lever 71 through the actuator 70, and moving the lever 71 counter-clockwise, as it appears in Figure 1. As this movement of the lever 71 continues, its upper extension engages the switch members 73 and 74, separating them from the stationary switch members 75 and 76. This opens both the energizing and holding circuits for the electromagnet 48. Deenergization of electromagnet 48 allows the armature 47 to move to its retracted position, thereby disengaging the clutch members 30 and 31 and allowing the valve 13 to return to its closed position.

Let it now be assumed that the valve has been manually opened and manually latched in open position when an overheating of the furnace takes place. Such overheating is particularly liable to occur during manual operation of the furnace, as the person operating the furnace is apt to forget that he has manually opened the valve. This is especially true where the valve is one which returns automatically to control by the thermostat as soon as power is again supplied to the system. Most power failures nowadays are of such short duration that overheating of the furnace would not be likely to occur during the period of such power failure. The householder or other person operating the furnace is therefore apt to move the valve to open position and rely on the return of power to unlatch the valve and return it to automatic control. In the event of an exceptionally long power failure, it is apparent that the furnace may become dangerously overheated. I have therefore provided means whereby the valve is returned to closed position upon overheating of the furnace, even during periods when the valve has been manually opened. As previously noted, the occurrence of an excessive temperature within the furnace 11 causes movement of the lever 71 in a counter-clockwise direction, as viewed in Figure 1. If this motion continues, the screw 80 carried by lever 71 engages the extension 81 of lever 44 and forcibly disengages the clutch members 30 and 31, thereby allowing the valve to return to closed position. The strain release spring 50 allows lever 44 to separate from armature 47 sufficiently to separate the clutch members 30 and 31. Armature 47 therefore remains in its latched position, as determined by lever 61. This, however, is unimportant, as the essential requirement is that the valve 13 be closed when an excessive temperature occurs in the furnace 11.

Figure 5:
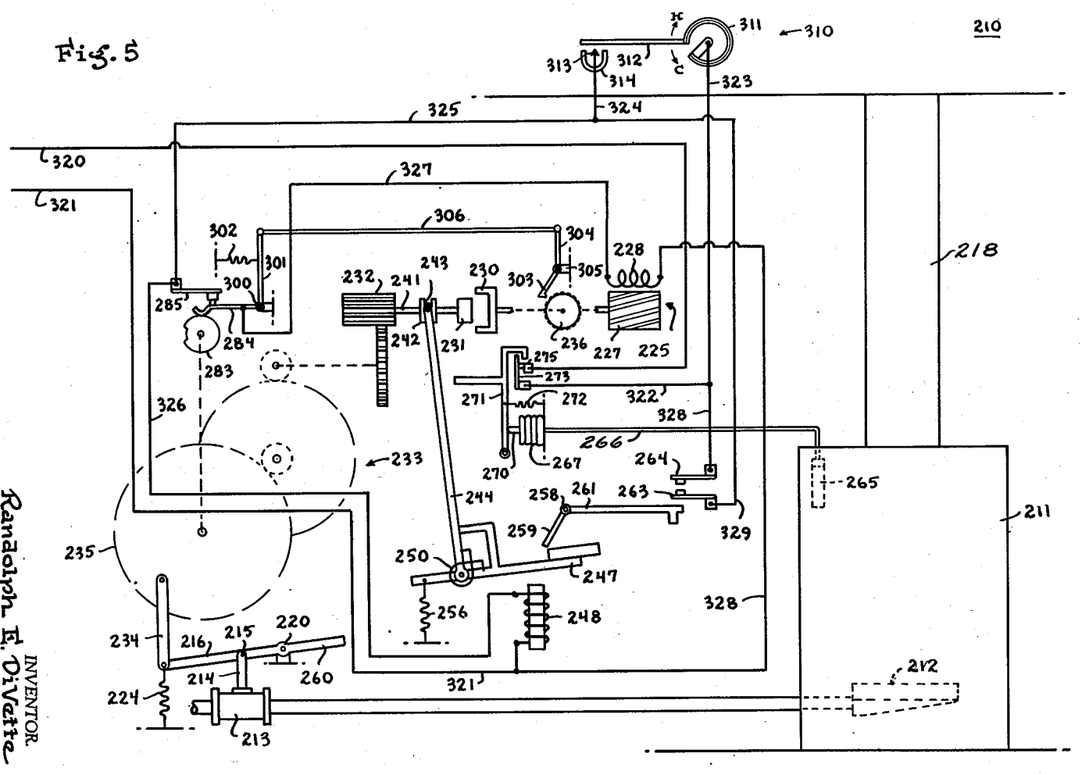
Figure 5 illustrates, somewhat diagrammatically, a different type of control system embodying my invention.

Figure 5

Figure 5 discloses a somewhat different type of system adapted particularly for the use of line voltage in the control circuit. The circuit connections are therefore somewhat different than those described in connection with Figure 1. In Figure 5 also, the motor limit switch is mechanically interlocked with the pawl which engages the ratchet, so that the pawl can engage the ratchet only when the valve is in open position. It has been found that this arrangement eliminates the noise attendant upon operation of the ratchet in the system of Figure 1.

In Figure 5, parts which correspond in structure and in function to similar parts in Figure 1 have been given reference characters in the 200 series corresponding to the reference character of the similar part in Figure 1. These parts will not be further described.

Parts which have no counterpart in Figure 1 have been assigned reference characters in the 300 series. These parts are described in detail hereinafter.

In Figure 5, the switch member 284 which is operated by cam 283, is rotatably mounted on a fixed pivot 300. Rigidly connected to member 284 so as to rotate therewith about the pivot 300 is an arm 301. A spring 302 biases the link 301 in a direction such that member 284 is held in engagement with cam 283.

A pawl 303, adapted for engagement with ratchet wheel 236, is mounted at one end of a bell-crank lever 304, pivoted at 305. A connecting link 306 is pivoted to the upper extremities of link 301 and lever 304.

The arrangement is such that when the notch on cam 283 passes under the follower 284, the latter is rotated about pivot 300 by spring 302. This motion is transmitted through links 301 and 306 and lever 304 to pawl 303, and the latter is moved into engagement with ratchet wheel 236.

Figure 5 shows a thermostat 310 of a different type than the thermostat 26 of Figure 1. Thermostat 310 comprises a bimetallic element 311 which supports a single switch finger 312. A stationary contact 313 is positioned for engagement by the switch finger 312. The finger 312 is at least partially made of magnetic material, and a permanent magnet 314 is positioned adjacent the contact 313 in order to impart a snap action to the movement of finger 312, in a manner well known in the art. The construction is such that the switch finger 312 is moved counter-clockwise upon a drop in temperature, as indicated by the legend in the drawing.

Power is supplied to the system from a pair of lines 320 and 321, which may be commercial power lines, or may be connected to any convenient source of electrical energy.

Operation of Figure 5

When the parts are in the position shown in the drawing, the thermostat 310 is satisfied. In other words, the temperature of the space 210 is above the value which the thermostat 310 has been set to maintain, and the thermostat is therefore not calling for heat. The valve 213 is therefore closed, and the furnace 211 is not in operation.

Let it be assumed that the temperature of the space 210 drops with the result that the bimetallic element 311 moves the contact finger 312 in a counter-clockwise direction, thereby causing its engagement with contact 313.

When contacts 312 and 313 engage, an energizing circuit is completed for the electromagnet 248. This circuit may be traced from the power line 320 through limit control switch contacts 275 and 273, conductors 322 and 323, bimetallic element 311, switch finger 312, contact 313, conductors 324, 325 and 326, and electromagnet 248 to the opposite power supply line 321.

Engagement of switch contacts 312 and 313 also completes an energizing circuit for motor field winding 228 which may be traced from the power supply line 320 through limit control switch contacts 275 and 273, conductors 322 and 323, bimetallic element 311, switch finger 312, contact 313, conductors 324 and 325, switch members 285 and 284, a conductor 327, winding 228, and a conductor 328 to the other power line 321.

Energization of the electromagnet 248 causes armature 247 to be attracted. The movement of armature 247 to its attracted position by solenoid 248 acts through the lever 244 to cause engagement of the clutch members 231 and 230. Therefore, upon energization of winding 228, the motor 225 drives the valve 213 to an open position through the gear train 233. When the valve 213 reaches open position, the switch member 284 drops into a notch on the surface of the cam 283, thereby separating switch member 285 and opening the circuit of motor winding 228. Simultaneously, as previously explained, pawl 303 moves into engagement with ratchet wheel 236. Motor 225 therefore stops, but is held from reverse rotation by engagement of pawl 303 with ratchet wheel 236. As long as contacts 312 and 314 remain in engagement, the circuit for the electromagnet 248, previously described, remains energized, thereby maintaining clutch members 230 and 231 in engagement and keeping the valve in open position.

As soon as the valve 213 is open, fuel is supplied to the burner 212, where it is ignited by any suitable igniting means, of conventional type (not shown). The furnace then begins to heat air which is distributed to the space 210 through a suitable duct 218. As this heated air is delivered to the space, the temperature in the space rises, and the thermostat 310 rotates the switch blade 312 in clockwise direction. As the bimetallic element rotates the switch blade 312 in a clockwise direction, it separates from the contact 313. This opens the previously traced circuit through electromagnet 248 thereby allowing armature 247 to move away from electromagnet 248 under the influence of the spring 256. This movement of armature 247 causes disengagement of clutch members 230 and 231, thereby relieving clutch member 231 from the braking effect of ratchet 236 and pawl 303. The valve then is returned to closed position by the spring 224, this motion being opposed only by the friction in the unloaded gear train.

In case of failure of the power supply, it may become necessary to open the valve 213 manually in order to supply heat to the space 210. This may be done by pushing down on the extension 260 of lever arm 216. After the valve 213 has been thus opened, it may be latched open by lifting up on the right-hand end of lever 261. When this is done, the lower end 259 of lever 261 engages the armature 247, forcing it down until the clutch members 230 and 231 are brought into engagement. The ratchet 236 and pawl 303 are then effective to prevent the reverse rotation of the motor necessary to allow the valve 213 to move to closed position. When the lever arm 261 is moved to its latching position, the lower end 259 of lever 261 will be moved to an almost vertical position. The self-bias of flexible switch arm 263 then acts on the lever 261 and tends to turn it in a clockwise direction back toward its unlatched position. Armature 247 is held in engagement with the lower end of lever 261 by means of the biasing spring 256, however, and the friction between armature 247 and lever 261 is sufficient to maintain it in its latched position against the bias of switch member 263. When it is desired to unlatch the valve manually, and allow it to return to its closed position, it is only necessary to move the lever arm 261 back to its normal or unlatched position. The armature 247 and its associated parts will then return to the position shown in the drawing, wherein the clutch members 230 and 231 are disengaged. The biasing spring 224 is then effective to return the valve 213 to closed position.

When the lever 261 is moved to its latched position, it engages switch member 263 and forces it into engagement with switch 264. The movement of armature 247 by lever 261 is just sufficient to engage clutch members 230 and 231 without moving armature 247 all the way down into engagement with the core of solenoid 248. An energizing circuit for electromagnet 248 is closed by engagement of contacts 263 and 264. This circuit may be traced from the power supply line 320 through the limit control contacts 275 and 273, conductors 322 and 328, switch contacts 264 and 263, conductors 329, 325, and 326, and electromagnet 248 to the opposite power line 321. When power is returned to the system while its switch 263, 264 is closed, the solenoid 248 is immediately energized. This pulls armature 247 down into its attracted position and away from lever 261, thereby releasing the friction which is holding it in its attracted position and allowing the self-bias of switch arm 263 to kick the lever 261 back towards its unlatched position. This of course opens the energizing circuit for solenoid 248 which extends through contacts 263 and 264. If no other energizing circuit for the electromagnet 248 exists at this time, the armature 247 returns to the position shown in the drawing, and the valve 213 is closed by the biasing spring 224. If the thermostat 310 is calling for heat at this time however, the electromagnet 248 remains energized through the energizing circuit first described and the valve remains in open position. It will therefore be seen that after the valve has been manually opened, it is immediately returned to the control of the thermostat as soon as power is again supplied to the system.

Let it now be assumed that the valve 213 has been moved to open position and that it is maintained in that position by energization of electromagnet 248 under control of thermostat 310. Let it further be assumed that the furnace 211 now becomes dangerously overheated, which condition may arise from some cause, as for example, the accidental blocking of the outlet duct 218, which permits the room thermostat 310 to maintain the contacts 312 and 313 closed. The increase in temperature within the furnace 211 expands the fluid in the bulb 265, thereby increasing its pressure. This increase in pressure is transmitted through the tube 266 to the bellows 267. Bellows 267 expands acting on the lever 271 through the actuator 270, and moving the lever 271 counter-clockwise, as it appears in Figure 5. As this movement of the lever 271 continues, its upper extension will engage the switch member 273, separating its from the stationary switch member 275. This opens the energizing circuit for the electromagnet 248. Deenergization of electromagnet 248 allows the armature 247 to move to its retracted position, thereby disengaging the clutch members 230 and 231 and allowing the valve 213 to return to its closed position.

Let it now be assumed that the valve has been manually opened and manually latched in open position when an overheating of the furnace takes place. As previously noted, the occurrence of an excessive temperature within the furnace 211 causes movement of the lever 271 in a counterclockwise direction, as viewed in Figure 5. If this motion continues, the long lateral extension on lever 271 engages the lever 244 and forcibly disengages the clutch members 230 and 231, thereby allowing the valve to return to closed position. The strain release spring 250 allows lever 244 to separate from armature 247 sufficiently to separate the clutch members 230 and 231. Armature 247 therefore remains in its latched position, as determined by lever 261. This however is unimportant, as the essential requirement is that the valve 213 be closed when an excessive temperature occurs in the furnace 211.

While I have described preferred embodiments of my invention, it will be apparent that modifications will occur to those skilled in the art, and it should therefore be understood that my invention is limited only by the scope of the appended claims.

I claim as my invention:

1. In combination, a fluid fuel burner, a valve controlling the supply of fuel to said burner, means biasing said valve to closed position, electrical means for opening said valve and maintaining said valve in open position, a source of electrical energy, thermostatic switch means for controlling the supply of electrical energy from said source to said electrical means, normally closed switch means connected in series with said electrical means, means for manually opening said valve and latching the same in open position during power failure conditions, and thermostatic means responsive to a limiting condition for opening said normally closed switch means and releasing said latching means when said limiting condition exceeds a predetermined value.

2. In combination, a member biased to a first safe position, electrical means for moving said member to a second active position and maintaining it in said second position, switch means operable to deenergize said electrical means and allow said member to return to said first safe position, manually operable means for moving said member to said second active position, releasable latch means for maintaining said member in said second active position, and control means responsive to a limiting condition for opening said switch means and mechanically releasing said latch means to insure return of said member to said first safe position when said limiting condition is reached.

3. In combination, a member biased to a first safe position, means including a motor for driving said member from said first position to a second active position, one-way braking means connected to said motor for preventing reverse rotation thereof, clutch means for connecting said motor and braking means to said member, means for operating said clutch including a movable armature and a strain release connection between said armature and said clutch, and control means responsive to a limiting condition for releasing said clutch independently of said armature by extending said strain release connection.

4. In combination, a member biased to a first safe position, means including a motor for driving said member from said first position to a second active position, one-way braking means connected to said motor for preventing reverse rotation thereof, clutch means for connecting said motor and braking means to said member, means for operating said clutch including a movable armature and a strain release connection between said armature and said clutch, electrical means for moving said armature to operate said clutch, switch means operable when open to deenergize said electrical means and cause disengagement of said clutch, manual means for operating said armature to cause engagement of said clutch, and control means responsive to a limiting condition to open said switch when said condition exceeds a predetermined value, and thereafter to mechanically release said clutch independently of said armature.

5. In combination, a member biased to a first safe position, electrical motor means for operating said member to a second active position, an energizing circuit for said motor including a switch, brake means operable to prevent movement of said motor means in reverse direction, and mechanical means operated by said motor when said member reaches said second position for opening said switch and operating said brake means to prevent reverse movement of said motor.

6. A temperature control system for a space, comprising in combination, means for supplying heat to said space including a control member movable between heat decreasing and heat increasing positions, means biasing said member to said heat decreasing position, electrical motor means for driving said member to said heat increasing position, ratchet means for preventing reverse movement of said motor, clutch means for connecting said motor and ratchet means to said member, means for operating said clutch means including an electromagnet and an armature actuated thereby, first switch means operated by movement of said armature, second switch means operated by said motor, third switch means including two pairs of sequentially engageable contacts, thermostatic means exposed to the temperature in said space for operating said third switch means so as to close said pairs of contacts in sequence upon a fall in temperature and to open said contacts in reverse sequence upon a rise in temperature, an energizing circuit for said electromagnet including both said pairs of contacts, a holding circuit for said electromagnet including said first switch means and the first to close of said pairs of contacts, and an energizing circuit for said motor including said first and second switch means and the first to close of said pairs of contacts.

7. In combination, a member movable between a first safe position and a second active position, means biasing said member to said first position, means for moving said member to said second position against said biasing means, brake means for holding said member in said second position against the action of said biasing means, clutch means for connecting said member and said brake means, means for operating said clutch means including a manually movable lever and latch means for maintaining said lever in clutch engaged position, strain release means connecting said lever and said clutch, and means responsive to a limiting condition for mechanically disengaging said clutch means without regard to the position of said lever by extending said strain release connection.

8. In combination, a member movable between a first safe position and a second active position, means biasing said member to said first position, means for moving said member to said second position against said biasing means, brake means for holding said member in said second position against the action of said biasing means, clutch means for connecting said member and said brake means, means for operating said clutch means including an electromagnet and an armature therefor, said armature being connected to said clutch means, means for biasing said armature to a first position in which said clutch is disengaged, said electromagnet being effective upon energization thereof to move said armature to a second position in which said clutch is engaged, automatic means controlling the energization of said electromagnet, manual means including a lever operable during power failure conditions to move said armature to a third position intermediate said first and second positions, said clutch being engaged when said armature is in said third position, means for biasing said lever to a normal position spaced from said armature, said armature biasing means being effective when said armature is in said third position to hold said armature against said lever and thereby prevent said lever from returning to said normal position, switch means operable to closed position by said lever upon movement thereof away from normal position, and an energizing circuit for said electromagnet including said switch means, whereby upon return of power when said switch is closed, said electromagnet moves said armature to said second position, releasing said lever and opening said switch, so that control of said electromagnet is returned to said automatic means.

9. In combination, a member movable between a first safe position and a second active position, means biasing said member to said first position, means for moving said member to said second position against said biasing means, brake means for holding said member in said second position against the action of said biasing means, clutch means for connecting said member and said brake means, an electromagnet for actuating said clutch means, said electromagnet operating when energized to connect said member and said brake means, manual means for actuating said clutch means to connect said member and said brake means, said manual means being biased to a normal position where it does not affect operation of said clutch means, latch means for maintaining said manual means in clutch engaging position, a connection between said electromagnet and said latch means for releasing said latch upon energization of said electromagnet, and means responsive to a limiting condition to deenergize said electromagnet when said condition exceeds a predetermined value, and effective upon continued increase of said condition beyond said predetermined value to mechanically operate said clutch to disconnect said member from said brake means.

10. In combination, a member biased to a first safe position, electrical motor means for operating said member to a second active position, an energizing circuit for said motor including a switch, brake means operable to prevent movement of said motor means in reverse direction, clutch means for connecting said motor and brake means with said member, means for operating said clutch means, and mechanical means operated by said motor when said member reaches said second position for opening said switch and operating said brake means to prevent reverse movement of said motor.

11. In combination, a member biased to a first safe position, electrical motor means for operating said member to a second active position, an energizing circuit for said motor including a switch, brake means operable to prevent movement of said motor means in reverse direction, clutch means for connecting said motor and brake means with said member, electromagnetic means for operating said clutch means and effective when energized to connect said motor and brake means with said member, means responsive to a condition indicative of the need for movement of said member for simultaneously energizing said electromagnetic means and said motor, and mechanical means operated by said motor when said member reaches said second position for opening said switch and operating said brake means to prevent reverse movement of said motor.

12. In combination, a member biased to a first safe position, electrical motor means for operating said member to a second active position, an energizing circuit for said motor including a switch, brake means operable to prevent movement of said motor means in reverse direction, clutch means for connecting said motor and brake means with said member, electromagnetic means for operating said clutch means and effective when energized to connect said motor and brake means with said member, means responsive to a condition indicative of the need for movement of said member for simultaneously energizing said electromagnetic means and said motor, mechanical means operated by said motor when said member reaches said second position for opening said switch and operating said brake means to prevent reverse movement of said motor, manual means for moving said member to said second position and thereby operating said brake, manual means for operating said clutch means to connect said motor and brake means with said member, and means responsive to a limiting condition for deenergizing said electromagnetic means and operating said clutch to disconnect said member from said motor and brake means.

13. In combination, a member movable between a first safe position and a second active position, means biasing said member to said first position, means for moving said member to said second position against said biasing means, brake means for holding said member in said second position against the action of said biasing means, clutch means for connecting said member and said brake means, means for operating said clutch means including an electromagnet and an armature actuated thereby, holding switch means operated by movement of said armature, control switch means including two pairs of sequentially engageable contacts, means responsive to a condition indicative of the need for operation of said member for operating said control switch means so as to close said pairs of contacts in sequence upon a change of said condition in one direction, and to open said pairs of contacts in reverse sequence upon a change in said condition in the opposite direction, an energizing circuit for said electromagnet including both pairs of contacts, and a holding circuit for said electromagnet including said holding switch means and the first to close of said pairs of contacts.

14. In combination, a member movable between a first safe position and a second active position, means biasing said member to said first position, means for moving said member to said second position against said biasing means, brake means for holding said member in said second position against the action of said biasing means, clutch means for connecting said member and said brake means, a condition responsive element responsive to a limiting condition, and means mechanically connecting said condition responsive element to said clutch means for mechanically disengaging said clutch means when said limiting condition assumes a predetermined value.

15. In combination, a member biased to a first safe position, electrical means including a motor operable when energized to move said member to a second active position and to maintain said member in said position, said electrical means being adapted to be controlled by a switch responsive to a controlling condition, clutch means between said electrical means and said member, manual means for moving said member to said active position and for engaging said clutch during periods of electrical power failure, and non-electrical means responsive to a limiting condition for mechanically disconnecting said clutch means during such periods of power failure when said limiting condition assumes a predetermined value.

16. In combination, a member biased to a first safe position, electrical means including a motor operable when energized to move said member to a second active position and to maintain said member in said position, said electrical means being adapted to be controlled by a switch responsive to a controlling condition, clutch means between said electrical means and said member, and non-electrical means responsive to a limiting condition for mechanically disconnecting said clutch means independently of said electrical means when said limiting condition assumes a predetermined value, said last named means comprising an expansible chamber and bulb filled with a temperature sensitive fluid, said chamber being operatively connected to said clutch element solely by mechanical connections.

17. In combination, a member biased to a first safe position, electrical motor means for moving said member to a second active position when said motor means is energized, driving connections between said motor means and member including a clutch and effective when said clutch is engaged to prevent movement of said member to said safe position despite deenergization of said motor means, means for operating said clutch including a movable armature and a strain release connection between said armature and said clutch, and control means responsive to a limiting condition for releasing said clutch independently of said armature by extending said strain release connection.

RANDOLPH E. DI VETTE.